Nov. 18, 1924.
J. W. REGNARY
END GATE
Filed April 20, 1922
1,516,118
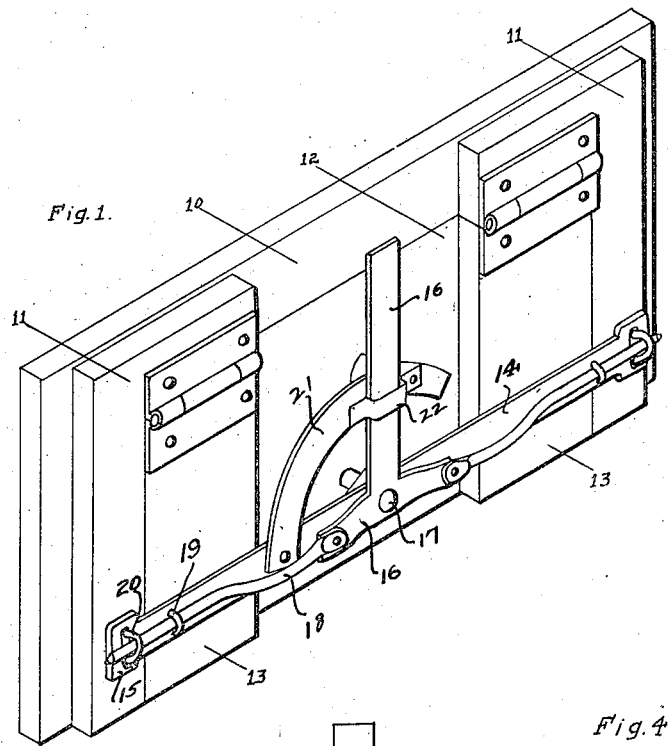
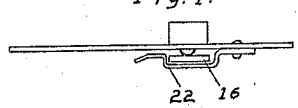
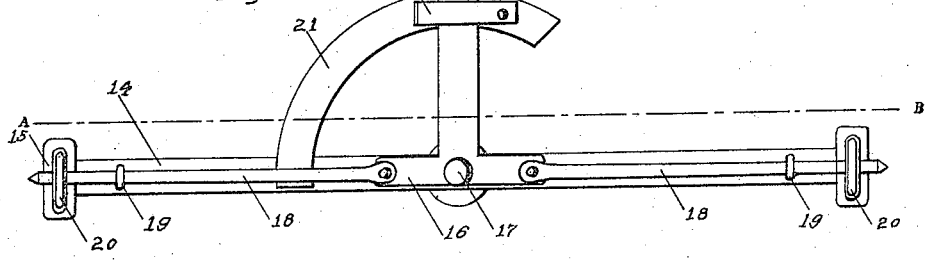
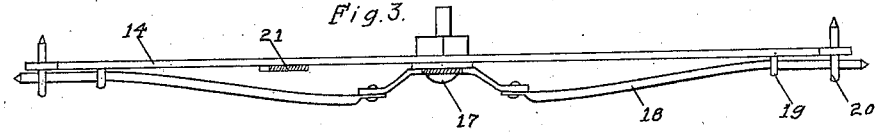
John W Regnary INVENTOR.
BY
Emil F. Lange ATTORNEYS.

Patented Nov. 18, 1924.

1,516,118

UNITED STATES PATENT OFFICE.

JOHN W. REGNARY, OF PETERSBURG, NEBRASKA.

END GATE.

Application filed April 20, 1922. Serial No. 555,703.

*To all whom it may concern:*

Be it known that I, JOHN W. REGNARY, a citizen of the United States, residing at Petersburg, in the county of Boone and State of Nebraska, have invented certain new and useful Improvements in End Gates, of which the following is a specification.

My invention relates to end gates for farm wagons of the kind used for hauling and unloading grain and similar substances.

According to present methods, the farmer hauls his grain to the local elevator, which in nearly all cases is equipped with a dumping platform. The platform is located in the driveway of the elevator, and is large enough and strong enough to accommodate a loaded grain wagon, the team remaining hitched to the wagon but in front of and off the platform. When the wagon and team are in this position, the platform trip is thrown, the wagon end gate is removed, and the rear end of the wagon is dropped at a sharp inclination to discharge the load of grain into the pit, which is directly underneath the platform. The load is thus discharged in a few seconds and the farmer then drives off with the empty wagon, the platform closing automatically as the wagon leaves it.

In recent years there has been an ever increasing tendency to install similar equipment on grain farms in order to cut down the labor cost of handling the grain, and many such farms now have elevators in their wheat and corn bins, in combination with some arrangement for rapidly discharging the grain from the wagon and into a place where the elevator can reach it. For this reason there are urgent demands for an improved end gate which can be easily and quickly opened and closed, and which will be securely locked while closed. My object is to provide an end gate having these advantages and others which will be brought out in the description.

Referring now to the drawings,

Figure 1 is a view from the rear and in perspective, of my end gate with the locking features.

Figure 2 is a plan view of the latch which I use on my end gate.

Figure 3 is a section on the line A—B of Figure 2.

Figure 4 is a detail.

Numeral 10 refers to the frame of the end gate. This frame is made in such a size and thickness that it will slide into the grooves into which the ordinary end gate fits. Secured to this frame are two L-shaped cleats 11, their inner edges being flush with the upper and side edges of the opening in the end gate. The door 12 is provided with two cleats 13, which are hinged at their upper ends to the legs of the L-shaped cleats 11. The end gate is strong, well-braced and durable, and when open it forms a spout through which the grain can be discharged by gravity or shovelled out by hand.

The latch or lock for the end gate is shown detached in Figures 2 and 3, and in place on the end gate in Figure 1. The bar 14 has ears 15 at each of its ends. The distance between the ears is equal to or slightly greater than the width of the opening in the end gate. Pivoted to the bar 14 at its middle point is a T-shaped lever 16, the pivot being designated by the numeral 17. Pivotally connected to the extremities of the arms of the T-shaped lever are links 18 adapted to slide in guides 19 which are secured to the bar 14. In securing the latch to the end gate, eye members 20 are secured through apertures in the ears 15 to the lower ends of the L-shaped cleats 11, with enough of the eye protruding to permit the passage therethrough of the ends of the links 18. It should be here noted that the ends of the links 18 are provided with rounded points to facilitate their entrance into the eyes 20. The ears 15 have apertures which are sufficiently large for the eye members to pass easily therethrough. The pivot member 17 is secured to the door 12 and bolted, riveted, clinched or otherwise secured thereto. The guide members 19 may be clinched to the under side of the bar 14, or they may be of such a length that they can be forced through the cleats 13. In the latter case the latch is secured to the door at three points, which makes the connection sufficiently rigid to withstand the rough usage which it must encounter.

In my preferred construction I bend the arms of the T-shaped lever as shown in Figure 3, and likewise I bend the links 18, the purpose of this arrangement being to prevent any binding action such as would occur if the parts were in close contact and subject to friction.

To the bar 14 I secure an arcuate member 21 on which the leg of the T-shaped lever 16 slides, and near the free end of the arcuate member I secure a catch 22 which is cut out of any suitable resilient material. This catch 22 is so positioned that it will hold the leg of the T-shaped lever 16 when the door is closed and latched. The arcuate member 21 is spaced from the outer wall of the door 12 by means of a washer, and is fastened to the door with any suitable fastening means passing through the arcuate member, the washer, and the door. By using a fastening means having a rounded head, the leg of the T-shaped lever 16 will be forced and more securely held in the catch 22.

The operation of the end gate is extremely simple. When it is desired to dump a load, it is only necessary for the driver to release the catch 22 and to push to the left the leg of the T-shaped lever 16. This draws in the links 18, and when the ends of these links have passed out of the eyes 20, the weight of the load will force the door open. After the load has been discharged, the driver closes the door and moves the leg of the lever 16 to the right until it engages the catch 22, which again securely locks the end gate.

Besides the catch connection 22, the end gate lock is held by the toggle or dead center relation of the pivots in the center and at the ends of the arms of the T-shaped lever 16. When locked, these three pivots are in line with the eyes 19 and 20, and even in the absence of the catch 22, it would be virtually impossible to accidently withdraw the ends of the links 18 from the eyes 20. It could only be done by displacement of the leg of the T-shaped lever 16, and the catch 22 absolutely prevents this. Nor is it possible to lose an end gate as so often happens with end gates of the detachable type in common use.

Having thus described my invention and its advantages, what I believe to be new and desire to secure by Letters Patent of the United States is:—

An endgate latch for use with a pivoted endgate, said latch comprising a strap which is adapted to be secured to the endgate with its extremities protruding beyond the sides of the endgate, said strap being provided with apertures in the protruding extremities, a T-shaped lever pivotally connected to said strap at its middle point, the arms of said lever being outwardly and laterally inclined, slidable links secured to the arms of said lever at their extremities, a pair of eye members secured to said strap to serve as guides for said slidable links, said eye members being provided with means passing through the strap for securing the strap to the endgate, an arcuate member secured to said strap and a latch secured to said arcuate member, said latch being adapted to engage the leg of said T-shaped lever, and a second pair of eye members which are adapted to receive the extremities of the sliding links and being adapted also to engage the apertures in the protruding extremities of the strap.

In testimony whereof I affix my signature.

JOHN W. REGNARY.